(12) United States Patent
Thier et al.

(10) Patent No.: US 7,631,479 B2
(45) Date of Patent: Dec. 15, 2009

(54) ADJUSTABLE PIVOT AXIS FOR BEDKNIFE ASSEMBLY

(75) Inventors: Richard D. Thier, Juneau, WI (US); Brent G. Rinholm, Fuquay-Varina, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/877,012

(22) Filed: Oct. 23, 2007

(65) Prior Publication Data
US 2009/0100818 A1  Apr. 23, 2009

(51) Int. Cl.
*A01D 34/53* (2006.01)
(52) U.S. Cl. ........................................................ 56/249
(58) Field of Classification Search ................... 56/249, 56/294, 251, 199
See application file for complete search history.

(56) References Cited

U.S. PATENT DOCUMENTS

| | | | | |
|---|---|---|---|---|
| 1,872,119 A * | 8/1932 | Carlson | ........................ | 56/294 |
| 2,204,255 A * | 6/1940 | Moyer | ......................... | 56/294 |
| 2,388,165 A | 10/1945 | Loewe et al. | | |
| 2,532,733 A | 12/1950 | Sawtelle | | |
| 2,869,309 A * | 1/1959 | Benson | ........................ | 56/249 |
| 2,896,390 A * | 7/1959 | Cunningham | ................ | 56/249 |
| 3,217,479 A * | 11/1965 | Robinson et al. | .............. | 56/254 |
| 3,423,919 A * | 1/1969 | Cook De Poy | ................ | 56/249 |
| 3,628,318 A * | 12/1971 | Grobowski | .................. | 56/249 |
| 3,680,293 A * | 8/1972 | Klemenhagen | .............. | 56/249 |
| 4,335,569 A * | 6/1982 | Keeney et al. | ................ | 56/249 |
| 4,481,757 A * | 11/1984 | Tsuchiya | ..................... | 56/16.9 |
| 4,606,178 A * | 8/1986 | Saiia | ........................... | 56/249 |
| 4,637,204 A * | 1/1987 | Benson et al. | ................ | 56/249 |
| 4,644,737 A * | 2/1987 | Arnold | ........................ | 56/249 |
| 5,170,613 A | 12/1992 | Heise et al. | | |
| 5,203,151 A * | 4/1993 | Mills | ........................... | 56/17.2 |
| 5,241,810 A * | 9/1993 | Reichen | ....................... | 56/249 |
| 5,291,724 A * | 3/1994 | Cotton | ........................ | 56/251 |
| 5,477,666 A * | 12/1995 | Cotton | ........................ | 56/251 |
| 5,822,966 A | 10/1998 | Snell | | |
| 5,950,409 A * | 9/1999 | Davies | ........................ | 56/249 |
| 6,044,637 A | 4/2000 | Thier et al. | | |
| 6,082,086 A * | 7/2000 | Togoshi et al. | ................ | 56/199 |
| 6,318,059 B1 * | 11/2001 | Cotton | ........................ | 56/251 |

(Continued)

FOREIGN PATENT DOCUMENTS

DE    1944325    3/1971

(Continued)

*Primary Examiner*—Árpád Fábián-Kovács

(57) ABSTRACT

A bedknife assembly for a reel mower cutting unit includes a cutting reel rotatably mounted to a frame, and a bedknife mounted to a bedknife support pivotally mounted to the frame in either a first position having a first pivot axis closer to the ground surface, or a second position having a second pivot axis further from the ground surface. The first pivot axis is further from the central axis of the cutting reel than the second pivot axis is from the central axis. The adjustable pivot axis may include a pair of eccentric pivot bushings mounted to the frame in either the first position or the second position. The adjustable pivot axis permits adjustment of the reel-to-bedknife gap after the reel is worn and its diameter is reduced, without dragging the bedknife on the turf, and extends the useful life of a cutting reel by increasing the adjustment range of the bedknife assembly.

20 Claims, 5 Drawing Sheets

U.S. PATENT DOCUMENTS

| | | | |
|---|---|---|---|
| 6,622,464 B2 * | 9/2003 | Goman et al. | 56/16.9 |
| 6,688,094 B2 * | 2/2004 | Berndt et al. | 56/249 |
| 7,114,318 B2 * | 10/2006 | Poulson et al. | 56/249 |
| 7,121,073 B2 * | 10/2006 | Schmidt et al. | 56/249 |
| 7,231,757 B2 * | 6/2007 | Poulson et al. | 56/249 |
| 7,377,092 B2 * | 5/2008 | Schmidt et al. | 56/249 |
| 2003/0140611 A1 * | 7/2003 | Burke | 56/17.2 |

FOREIGN PATENT DOCUMENTS

GB     561474     5/1944

* cited by examiner

ADJUSTABLE PIVOT AXIS FOR BEDKNIFE ASSEMBLY

FIELD OF THE INVENTION

This invention relates generally to reel mower cutting units, and specifically to adjusting the pivot axis of a reel mower cutting unit's bedknife with respect to the blades of the reel.

BACKGROUND OF THE INVENTION

Conventional reel mower cutting units are used on golf courses and other turf areas that require grass to be cut very accurately. The cutting units are typically rolled across the surface of the ground by a powered vehicle. These cutting units include a generally cylindrical reel that has a plurality of blades which rotate in close proximity to a stationary bedknife fixed with the frame of the cutting unit. Grass is cut by a shearing action between the bedknife and the rotation blades of the reel. The height at which grass is cut can be adjusted by altering the height at which the cutting unit frame is positioned above the ground surface. The bedknife is routinely serviced and adjusted to be in proper position with respect to the reel blades such that the grass is cut effectively. Conventional cutting units provide a linkage that allows an operator to adjust the position of the bedknife with respect to the reel blades.

Examples of linkages for adjusting bedknives are shown in U.S. Pat. No. 5,822,966 assigned to Textron Inc. and U.S. Pat. No. 6,044,637 assigned to Deere & Company. Adjustment of the bedknife may be needed because the reel wears and decreases in diameter over time. For example, wear may be due to field conditions or accepted maintenance procedures including sharpening. On many reel mowers, one may adjust the bedknife by rotating the bedknife assembly on a pivot axis to maintain the cutting surface of the bedknife in close proximity to the reel. The pivot axis may be defined by bushings that are rigidly mounted to the mower frame. Pivot shoulder bolts are mounted the bedknife support or shoe, and freely rotate within the bushings to allow the bedknife assembly to be rotated and adjusted to the reel.

In many cases, if a cutting reel becomes increasingly worn and its diameter is reduced, further adjustment of the bedknife may cause the non-cutting rear surface of the bedknife to drag on the turf. In other words, adjustments cause the bedknife to rotate so that the bedknife's non-cutting rear surface drops below the cutting edge. Dragging the rear surface of the bedknife can be a serious problem, especially in areas where a low height-of-cut is demanded. For example, some golf course greens may require a height-of-cut of about three millimeters.

Dragging the bedknife is unacceptable because it can damage the turf. Before that occurs, the reel may need to be replaced so that the bedknife may be rotated back to an acceptable position. Replacing the reel is costly and labor intensive. For that reason, it would be desirable to increase the adjustment range of the bedknife, to permit continued adjustment of the reel-to-bedknife gap after the cutting blades are worn and the reel diameter is reduced. It would be desirable to allow continued adjustment of the bedknife without dragging the bedknife on the turf. It would be desirable to extend the useful life of a cutting reel by adjusting the pivot axis of the bedknife assembly.

SUMMARY OF THE INVENTION

An adjustable pivot axis is provided for a bedknife assembly. The adjustable pivot axis permits adjustment of the reel-to-bedknife gap after the reel is worn and its diameter is reduced, without dragging the bedknife on the turf. The adjustable pivot axis extends the useful life of a cutting reel by increasing the adjustment range of the bedknife assembly. The adjustable pivot axis may include a pair of eccentric pivot bushings mounted to the frame of the cutting reel.

DESCRIPTION OF THE PREFERRED EMBODIMENT

Figure 1:
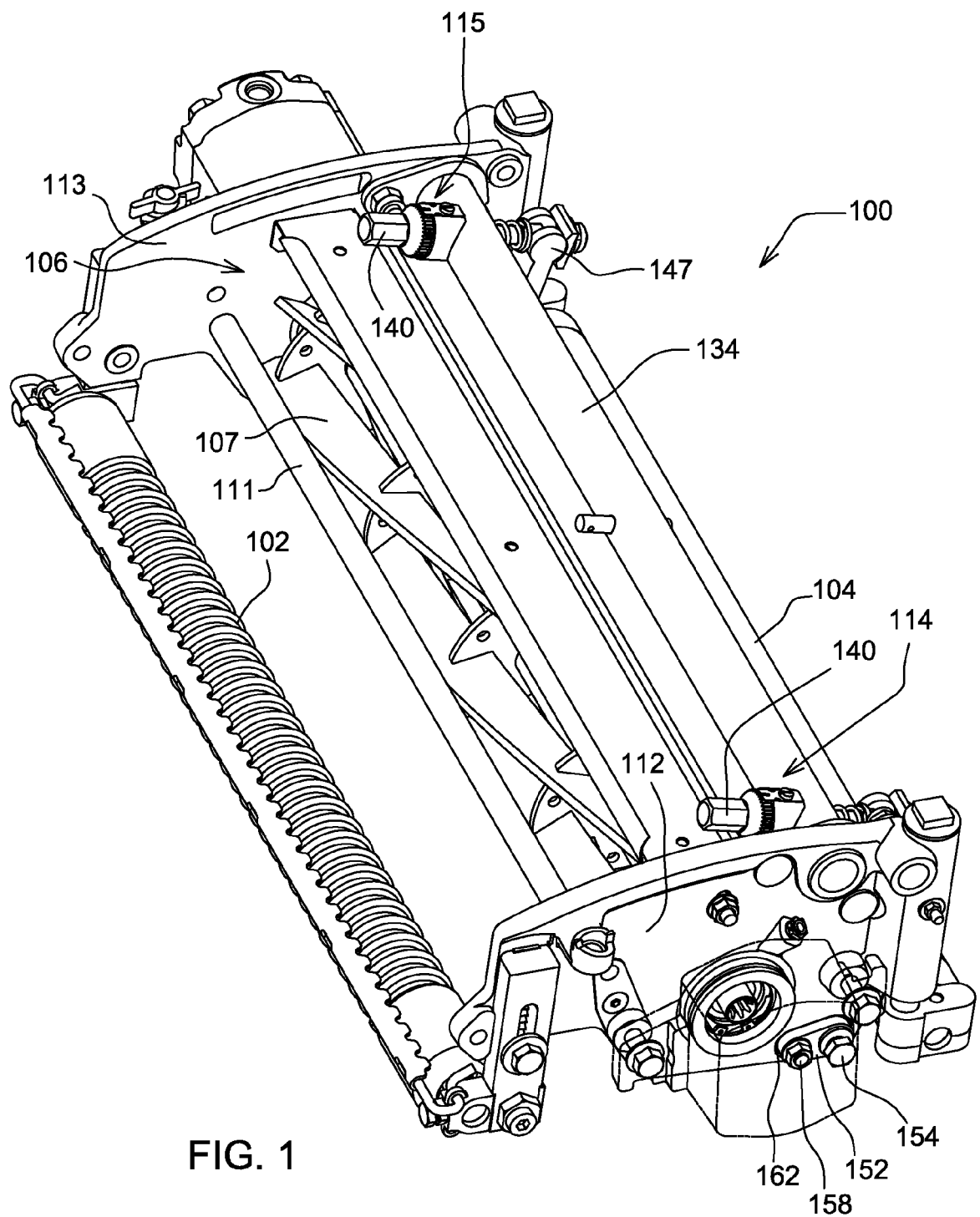
FIG. 1 is a perspective view of a reel cutting unit with an adjustable pivot axis according to a first embodiment of the invention.

In the embodiment shown in FIGS. 1-5, reel mower cutting unit 100 is shown with an adjustable pivot axis for a bedknife assembly. Several reel mower cutting units may be mounted to a vehicle that is driven across the ground. Lift arms connected between the vehicle and the cutting units propel the cutting units along the ground. Each cutting unit may have front and rear rollers 102 and 104 that roll in contact with the ground and support the cutting unit during mowing operations. Each cutting unit includes a generally cylindrical reel 106 having a plurality of blades 107 that rotate about the reel's laterally extending central axis 108. The cylindrical reel may be rotated with an electric or hydraulic motor, for example. As the blades rotate they pass in close proximity to bedknife 110 that is positioned between left and right side panels 112, 113 of the cutting unit frame. The cutting unit frame also may include one or more cross bars 111 connecting the left and right side panels. The blades and bedknife interact to cut grass with a shearing action as the cutting unit is propelled forward.

Figure 2:
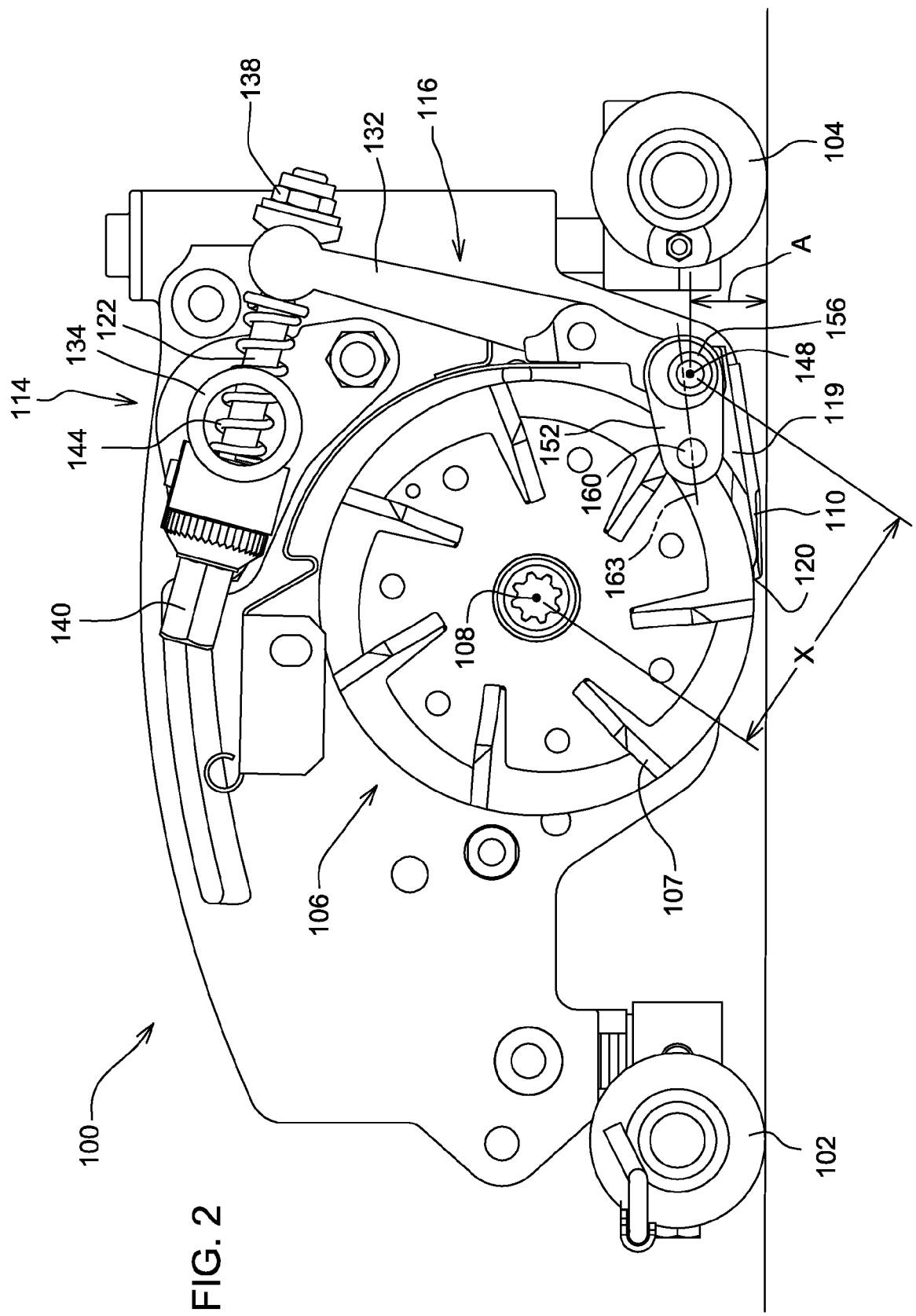
FIG. 2 is a side view, partially in section, of a reel cutting unit with an adjustable pivot axis in a first position according to a first embodiment of the invention.
Figure 3:
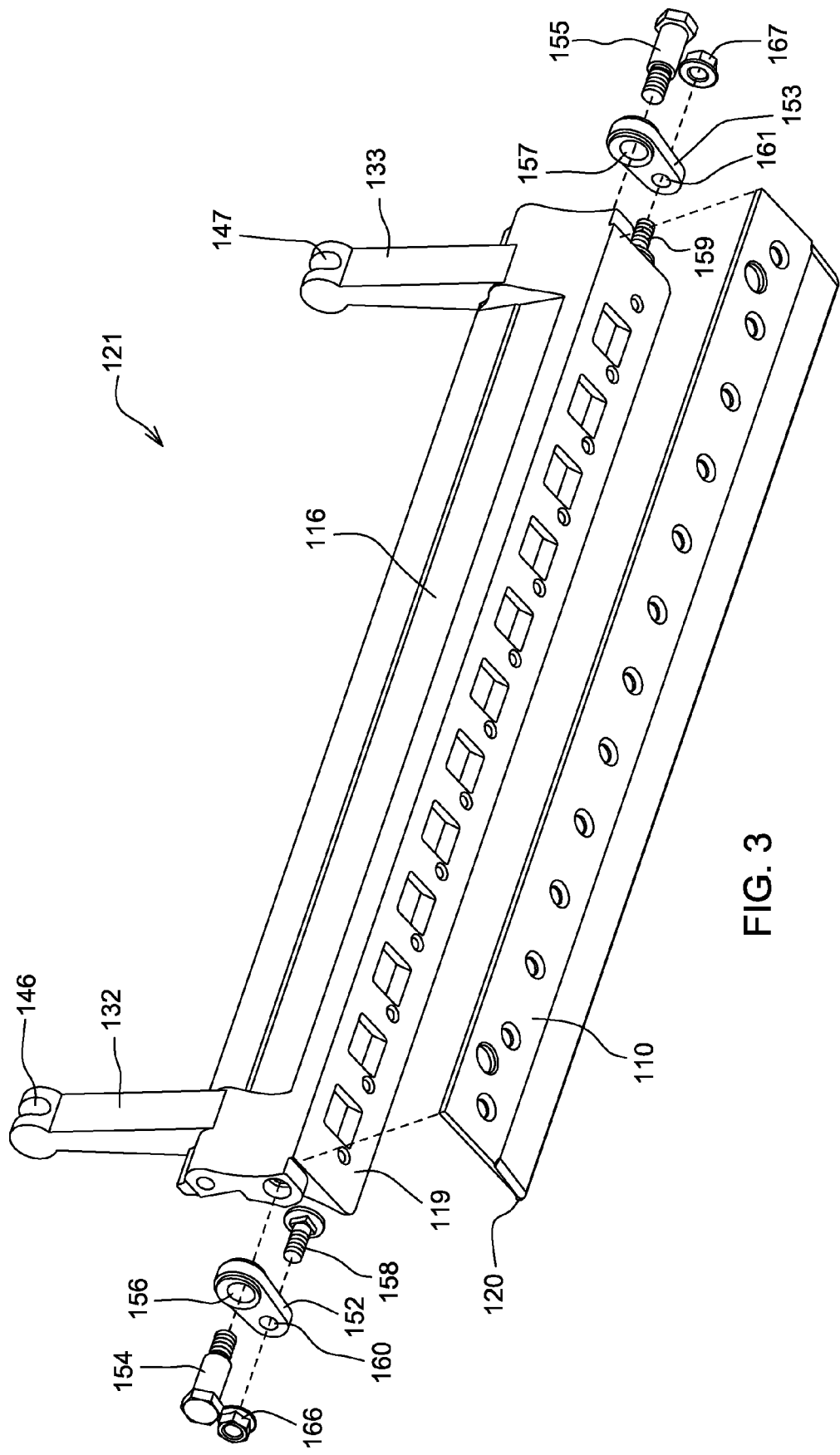
FIG. 3 is a perspective view of a bedknife assembly with an adjustable pivot axis in a first position according to a first embodiment of the invention.
Figure 4:
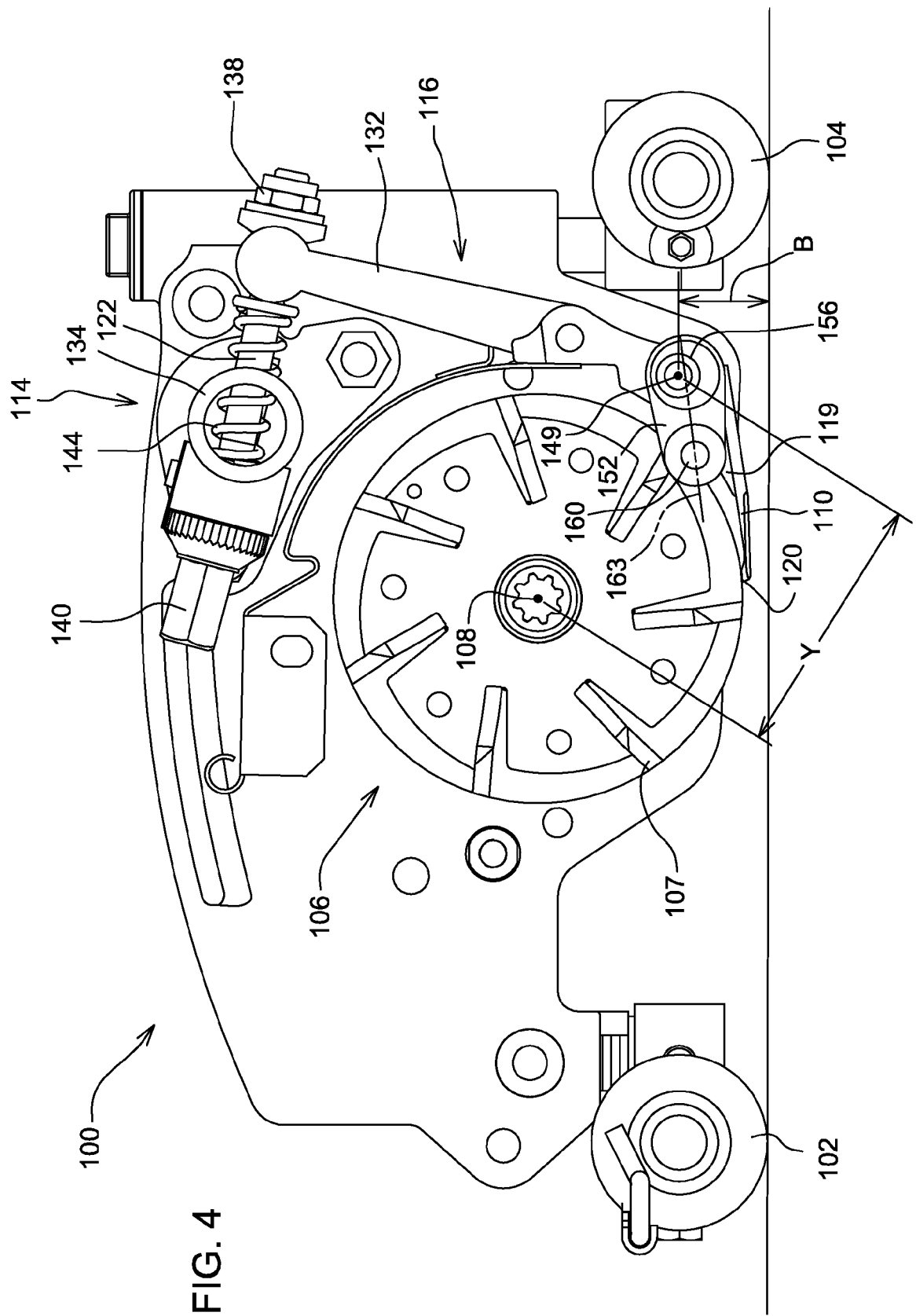
FIG. 4 is a side view, partially in section, of a reel cutting unit with an adjustable pivot axis in a second position according to a first embodiment of the invention.
Figure 5:
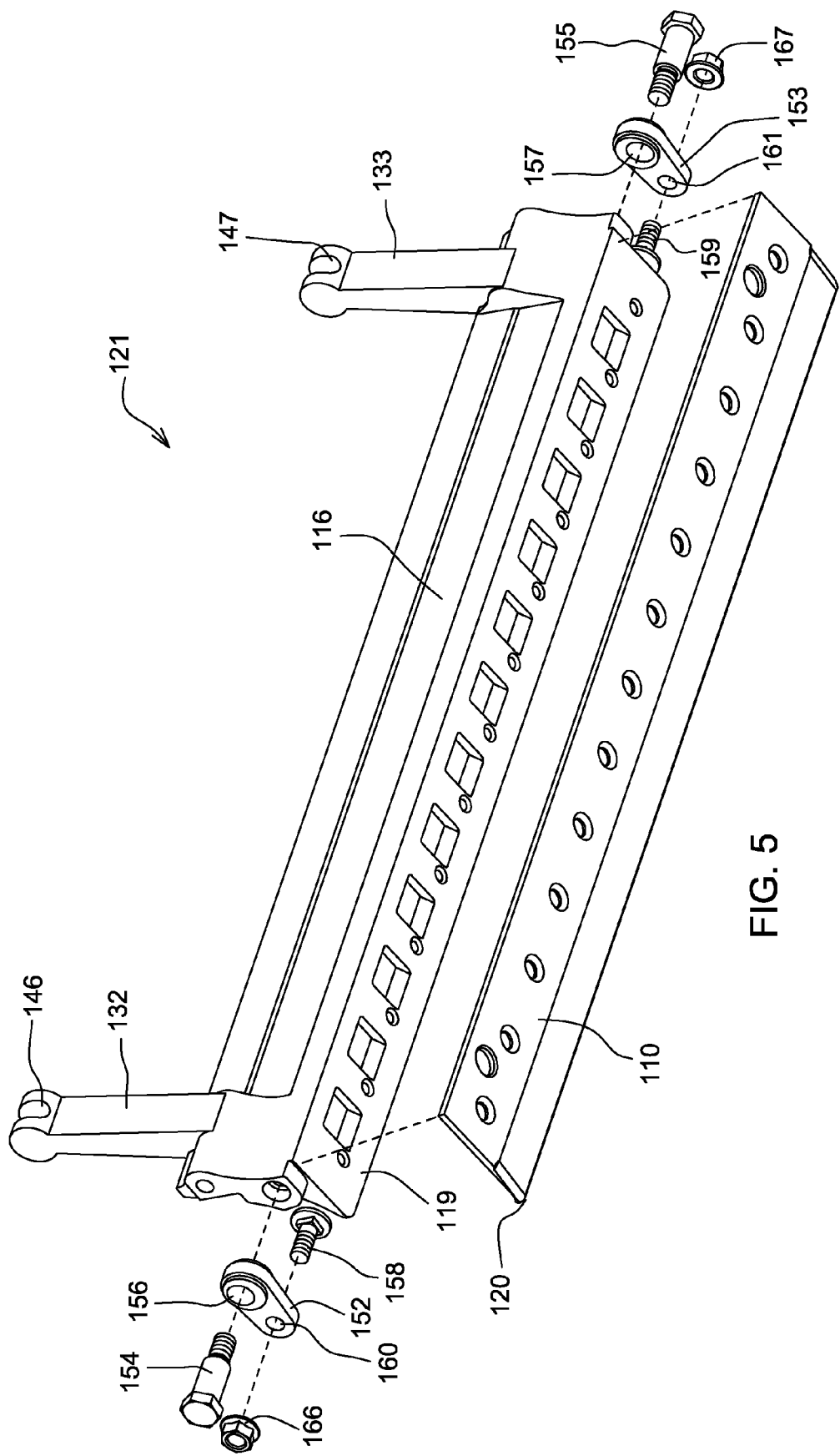
FIG. 5 is a perspective view of a bedknife assembly with an adjustable pivot axis in a second position according to a first embodiment of the invention.

In one embodiment, the reel mower cutting unit includes left and right adjustment linkages 114 and 115. As shown in FIGS. 2 and 4, the pair of adjustment linkages are used to adjust the position of bedknife 110 with respect to reel blades 107 so that the shearing action can be fine tuned for providing a high quality cut. The bedknife is removably attached and secured to attachment surface 119 of bedknife support 116. The bedknife support can be adjusted to pivot to move the bedknife forward so that the cutting edge 120 of the bedknife can swing toward or away from reel blades 107, changing the reel-to-bedknife gap. Bedknife assembly 121, including bedknife support 110, bedknife 110, and eccentric pivot bushings 152, 153, are shown in FIGS. 3 and 5.

In one embodiment, each adjustment linkage 114, 115 includes a rod 122 and an adjustment member 140. The adjustment linkages may be used to move cutting edge 120 of bedknife 110 toward or away from reel blades 107. This may be done by rotating the adjustment member to shift the rod along the rod's central axis. As the rod shifts along its central axis, this causes bedknife support 116 to pivot on the pivot axis and move the cutting edge 120 of bedknife 110 toward or away from the reel blades.

In one embodiment, each adjustment member 140 has internal threads that engage external threads on a first or forward portion of rod 122. Each rod extends through an opening in tube 134. The tube may be positioned perpendicular to the rods and parallel to the central axis of the reel. The second or rearward portion of each rod engages an upwardly extending arm 132, 133 of bedknife support 116. For example, each upwardly extending arm may have a slot 146, 147, and the second or rear portion of each rod may be inserted through the slot. The second or rearward end of the rod may be inserted through the slot and fastened to the arm by a threaded nut 138, allowing the rod to shift within the slot as the bedknife support pivots during adjustment of the reel-to-bedknife gap setting, or to shift within the slot while switching the bedknife assembly between the first pivot axis and the second pivot axis. To secure the rod in place once an adjustment of the reel-to-bedknife gap is made, the rod may be positioned within the coils of compression spring 144 which applies an axial force on the rod tending to resist rotation of the adjustment member.

In one embodiment, bedknife assembly 121 is pivotally mounted between cutting unit side panels 112, 113 so that it has an adjustable pivot axis. For example, the bedknife assembly may have a first pivot axis and a second pivot axis. The first pivot axis may be closer to the ground surface, and further from the central axis 108 of the cutting reel, than the second pivot axis. In FIG. 2, first pivot axis 148 is a distance A from the ground surface, and a distance X from central axis 108 of the cutting reel. In FIG. 4, second pivot axis 149 is a distance B from the ground surface, and a distance Y from the central axis 108 of the cutting reel.

In one embodiment, the first pivot axis and the second pivot axis may be provided by using eccentric pivot bushings 152, 153. Each eccentric pivot bushing may be mounted to the reel cutting unit in either a first position or a second position, each position providing a different pivot axis for the bedknife support, and each position also providing a different range of settings for the reel-to-bedknife gap. If the eccentric pivot bushings are mounted in the first position, the first pivot axis is closer to the ground surface and further from the central axis of the cutting reel. In the first position, the eccentric pivot bushings also provide a range of reel-to-bedknife settings for that pivot axis that are satisfactory for relatively new or unworn reel blades. If the eccentric pivot bushings are mounted in the second position, the second pivot axis is closer to the ground surface and closer to the central axis of the cutting reel. In the second position, the eccentric pivot bushings provide a range of reel-to-bedknife settings that are satisfactory for reel blades having a smaller diameter; i.e., worn blades. Thus, the second position effectively moves the pivot axis of the bedknife closer further off the ground and closer to the cutting reel axis when compared to the first position.

In one embodiment, each eccentric pivot bushing 152, 153 may be a generally oblong or oval metal component having first and second openings. First threaded fasteners 154, 155 may be inserted through first openings 156, 157 and secured to threaded openings in the opposing ends of bedknife support 116. The first threaded fasteners provide the pivot axis for the bedknife support. Second threaded fasteners 158, 159 may be inserted through second openings 160, 161 and tightened onto nuts 166, 167 to secure the eccentric pivot bushings to side panels 112, 113 of the cutting unit frame. Additionally, each side panel may have a recessed area 162 for an eccentric pivot bushing, having dimensions similar to the eccentric pivot bushing, to help position each eccentric pivot bushing in place on the side panel.

In FIGS. 2 and 3, eccentric pivot bushings 152, 153 are mounted in their first positions, so that first threaded fasteners 154, 155 provide a first pivot axis 148 for bedknife assembly 121. The first openings 156, 157 in the eccentric pivot bushings are at least about 1 mm to about 3 mm and most preferably about 2 mm, below centerline 163 of the eccentric pivot bushing. When the first threaded fasteners are inserted through the eccentric pivot bushings in the first position, first pivot axis 148 for the bedknife assembly is a distance X from the cutting reel axis 108, and a distance A from the ground surface. Additionally, the adjustment linkages may be used to move the bedknife within a range of reel-to-bedknife gap settings that are satisfactory for new, unworn reel blades.

In FIGS. 4 and 5, the eccentric pivot bushings are mounted in a second position wherein the first threaded fasteners 154, 155 provide a second pivot axis 149 for bedknife assembly 121. To mount the eccentric pivot bushings in the second position, the first and second threaded fasteners are removed from the openings, and the eccentric pivot bushings are then flipped over so that the first openings 156, 157 are at least about 1 mm to about 3 mm, and most preferably about 2 mm, above centerline 163. When the first threaded fasteners are inserted through the eccentric pivot bushings in the second position, second pivot axis is a distance Y from the cutting reel axis 108, and a distance B from the ground surface. Distance Y is less than distance X, and distance B is greater than distance A. Additionally, the adjustment linkages may be used to move the bedknife within a range of reel-to-bedknife gap settings that are satisfactory for worn reel blades that may have a slightly reduced diameter. The second pivot axis permits the adjustment linkages to be used to achieve a desired reel-to-bedknife gap setting without rotating the bedknife into a position that drags against the turf. If the cutting reel has worn to the point where the desired height-of-cut or reel-to-bedknife gap cannot be achieved without excess rotation of the bedknife, the eccentric pivot bushing can be removed and flipped over to provide the desired height-of-cut and reel-to-bedknife gap without dragging the bedknife on the turf.

Having described a preferred embodiment, it will become apparent that various modifications can be made without departing from the scope of the invention as defined in the accompanying claims.

The invention claimed is:

1. A bedknife assembly for a reel mower cutting unit for mowing grass on a ground surface, comprising:
   a cutting reel rotatably mounted to a frame; and
   a bedknife mounted to a bedknife support mounted to the frame through an eccentric pivot bushing that may be oriented in a first direction to provide a first pivot axis and oriented in a second direction to provide a second pivot axis; the bedknife support being pivotable on both the first pivot axis and the second pivot axis to move the bedknife toward or away from the cutting reel.

2. The bedknife assembly of claim 1 wherein the cutting reel has a central axis of rotation, and the first pivot axis is further from the central axis than the second pivot axis is from the central axis.

3. The bedknife assembly of claim 1 further comprising a pair of eccentric pivot bushings mounted to the frame to define both the first pivot axis and the second pivot axis.

4. The bedknife assembly of claim 1 wherein the cutting reel has a plurality of blades, and the first pivot axis provides a first range of settings for a gap between the bedknife and the blades, and the second pivot axis provides a second range of settings for a gap between the bedknife and the blades.

5. The bedknife assembly of claim 4 further comprising a pair of arms extending upwardly from the bedknife support.

6. The bedknife support of claim 5 further comprising an adjustment linkage engaging each of the arms for changing the settings for the gap between the bedknife and blades.

7. The bedknife support of claim 5 wherein the upper ends of the arms include slots through which the adjustment linkages extend.

8. A bedknife assembly for a reel mower cutting unit for mowing grass on a ground surface, comprising:
a bedknife mounted to a bedknife support;
the bedknife support being mounted through reversible eccentric bushing to the reel mower cutting unit so that the bedknife support pivots on both a first pivot axis and a second pivot axis;
the first pivot axis being closer to the ground surface than the second pivot axis; and
an adjustment linkage connected to the bedknife support to change a reel-to-bedknife gap by pivoting the bedknife support on either of the first pivot axis or the second pivot axis.

9. The bedknife assembly of claim 8 further comprising a cutting reel having a plurality of blades and a central axis of rotation, the distance between the first pivot axis and the central axis being greater than the distance between the second pivot axis and the central axis.

10. The bedknife assembly of claim 8 wherein the reversible eccentric bushings are a pair of eccentric pivot bushings between the bedknife support and reel mower cutting unit, each reversible eccentric pivot bushing having a first opening defining the first pivot axis and the second pivot axis.

11. The bedknife assembly of claim 10 wherein the reversible eccentric pivot bushings are mounted to the reel mower cutting unit in a first orientation for the first pivot axis, and in a second orientation for the second pivot axis.

12. The bedknife assembly of claim 10 further comprising second openings through the reversible eccentric pivot bushings for mounting the reversible eccentric pivot bushings to the reel mower cutting unit.

13. A bedknife assembly for a reel mower cutting unit for mowing grass on a ground surface, comprising:
a bedknife having a cutting edge and secured to a bedknife support;
a bedknife support having opposing ends and being connected to an adjustment linkage, the adjustment linkage including an adjustment member to pivot the bedknife support and move the cutting edge of the bedknife toward or away from a plurality of reel blades of the reel mower cutting unit;
an adjustable pivot axis on each end of the bedknife support, the adjustable pivot axis being secured through a pair of reversible eccentric bushings onto the reel mower cutting unit such that reversing the bushings provides an alternative fixed position about which the adjustment linkage pivots the bedknife support.

14. The bedknife assembly of claim 13 wherein the adjustable pivot axis provides a first pivot axis and a second pivot axis, the distance between the first pivot axis and the ground surface being less than the distance between the second pivot axis and the ground surface.

15. The bedknife assembly of claim 14 wherein the reel mower cutting unit includes a central axis of rotation, the first pivot axis being further from the central pivot axis than the second pivot axis is from the central pivot axis.

16. The bedknife assembly of claim 13 further comprising an eccentric pivot bushing at each of the opposing ends of the bedknife support to define the adjustable pivot axis.

17. The bedknife assembly of claim 13 wherein the pair of reversible eccentric bushings are eccentric pivot bushing is mounted in a first position to define a first pivot axis, and in a second position to define a second pivot axis.

18. The bedknife assembly of claim 17 wherein the reel mower cutting unit includes a frame having side panels on which the pair of reversible eccentric bushings are mounted.

19. The bedknife assembly of claim 13 wherein the adjustment linkage includes a threaded rod on which the adjustment member rotates.

20. The bedknife assembly of claim 13 further comprising a pair of arms extending upwardly from the bedknife support, each arm engaged by the adjustment linkage.

* * * * *